US011799754B2

(12) United States Patent
Wittenschlaeger

(10) Patent No.: US 11,799,754 B2
(45) Date of Patent: Oct. 24, 2023

(54) NON-OVERLAPPING SECURED TOPOLOGIES IN A DISTRIBUTED NETWORK FABRIC

(71) Applicant: Nant Holdings IP, LLC, Culver City, CA (US)

(72) Inventor: Thomas M. Wittenschlaeger, Irvine, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 255 days.

(21) Appl. No.: 17/399,035

(22) Filed: Aug. 10, 2021

(65) Prior Publication Data

US 2021/0377148 A1 Dec. 2, 2021

Related U.S. Application Data

(63) Continuation of application No. 13/653,196, filed on Oct. 16, 2012, now Pat. No. 11,095,549.

(51) Int. Cl.
*H04L 45/02* (2022.01)
*H04L 45/128* (2022.01)
(Continued)

(52) U.S. Cl.
CPC .......... *H04L 45/02* (2013.01); *H04L 41/0813* (2013.01); *H04L 41/0893* (2013.01); *H04L 45/127* (2013.01); *H04L 45/128* (2013.01); *H04L 45/1283* (2013.01); *H04L 45/1287* (2013.01); *H04L 45/306* (2013.01); *H04L 63/0209* (2013.01)

(58) Field of Classification Search
None
See application file for complete search history.

(56) References Cited

U.S. PATENT DOCUMENTS 6,256,295 B1 7/2001 Callon
7,352,745 B2 4/2008 Perera et al.
(Continued)

FOREIGN PATENT DOCUMENTS

| WO | 2010131150 A1 | 11/2010 |
| WO | 2012068443 A1 | 5/2012 |
| WO | 2012092031 A1 | 7/2012 |

OTHER PUBLICATIONS

Milione, et al., Higher-Order Poincare' Sphere, Stokes Parameters, and the Angular Momentum of Light, Physical Review Letters, 2011, pp. 053601-1-053601-4, vol. 7.
(Continued)

*Primary Examiner* — David W Lambert
(74) *Attorney, Agent, or Firm* — Harness Dickey & Pierce P.L.C.

(57) ABSTRACT

Networks comprising multiple non-overlapping communication topologies are presented. The networks can include a fabric of interconnected network nodes capable of providing multiple communication paths among edge devices. A topology manager constructs communication topologies according to restriction criteria based on required security levels (e.g., top secret, secret, unclassified, etc.). Established topologies do not have overlapping networking infrastructure to within the bounds of the restriction criteria as allowed by the security levels.

20 Claims, 5 Drawing Sheets

Related U.S. Application Data

(60) Provisional application No. 61/550,055, filed on Oct. 21, 2011.

(51) Int. Cl.
*H04L 45/302* (2022.01)
*H04L 45/12* (2022.01)
*H04L 41/0893* (2022.01)
*H04L 41/0813* (2022.01)
*H04L 9/40* (2022.01)

(56) References Cited

U.S. PATENT DOCUMENTS

| | | | |
|---|---|---|---|
| 7,548,545 B1 | 6/2009 | Wittenschlaeger | |
| 7,548,556 B1 | 6/2009 | Wittenschlaeger | |
| 7,599,314 B2 | 10/2009 | Wittenschlaeger | |
| 7,603,428 B2 | 10/2009 | Wittenschlaeger | |
| 7,673,011 B2 | 3/2010 | Archer et al. | |
| 7,742,445 B2 | 6/2010 | Stewart et al. | |
| 7,904,602 B2 | 3/2011 | Wittenschlaeger | |
| 8,001,280 B2 | 8/2011 | Blumrich et al. | |
| 8,484,353 B1* | 7/2013 | Johnson | H04L 67/10 370/312 |
| 9,762,537 B1* | 9/2017 | Eyada | H04L 45/02 |
| 2004/0247317 A1* | 12/2004 | Sadananda | H04L 45/02 398/57 |
| 2006/0159020 A1* | 7/2006 | Porat | H04L 41/0803 370/235 |
| 2006/0291455 A1 | 12/2006 | Katz et al. | |
| 2008/0137532 A1 | 6/2008 | Namburi et al. | |
| 2009/0154454 A1* | 6/2009 | Wittenschlaeger | H04L 63/18 370/389 |
| 2009/0228575 A1* | 9/2009 | Thubert | H04W 40/28 709/220 |
| 2009/0274157 A1* | 11/2009 | Vaidya | H04W 40/24 370/400 |
| 2009/0316619 A1* | 12/2009 | Wittenschlaeger | H04B 7/18504 370/316 |
| 2010/0312913 A1 | 12/2010 | Wittenschlaeger | |
| 2011/0066851 A1* | 3/2011 | Bello | H04L 63/08 709/225 |
| 2013/0101291 A1 | 4/2013 | Wittenschlaeger | |

OTHER PUBLICATIONS

Physorg.com, "New Technique Offers Enhanced Security For Sensitive Data In Cloud Computing," Physorg.com website, Technology/Computer Science, Oct. 5, 2011, accessed at http://www.physorg.com/print237031071.html.

Showalter, Mark, "Introducing The New Infinera DTN-X," Infinera Digital Optical Transport Solutions—Blog, Sep. 15, 2011, accessed at http:i/infinera.wordpress.com/2011/09/15/introducing-the-infinera-dtn-x/.

Infinera, "Is Your Network Ready?", Infinera Digital Optical Transport Solutions—Blog, Aug. 15, 2011, accessed at http:i/infinera.wordpress.com/2011/08/15/is-your-network-ready/.

Infinera, "Netflix's Price Hike And The Bandwidth Dilemma", Infinera Digital Optical Transport Solutions—Blog, Aug. 14, 2011, accessed at htlp://infinera.wordpress.com/2011/08/04/netflixs-price-hike-and-the-bandwidth-dilemma/.

Infinera, "Inventing the Colorless, Directionless and Contentionless ROADM", Infinera Digital Optical Transport Solutions—Blog, Jul. 22, 2011, accessed at htlp://infinera.wordpress.com/2011/07/22/inventing-the-colorless-directionless-and-contentionless-roadm/.

Capuano. Mike. "Welcome to Infinera's Blog," Infinera Digital Optical Transport Solutions—Blog, Jul. 13, 2011, accessed at http://infinera.wordpress.com/2011/07/13/welcome-to-infinera%E2%80%99s-blog/.

Physorg.com, "Physicists Map Spiraling Light To Harness Untapped Data Capacity," Physorg.com website, Physics/General Physics, Aug. 25, 2011, accessed at http://www.physorg.com/print233507423.html.

* cited by examiner

NON-OVERLAPPING SECURED TOPOLOGIES IN A DISTRIBUTED NETWORK FABRIC

This application is a continuation of U.S. patent application Ser. No. 13/653,196, filed on Oct. 16, 2012. This application claims the benefit of U.S. Provisional Application No. 61/550,055, filed on Oct. 21, 2011. The entire disclosures of each of the above applications are incorporated herein by reference.

FIELD OF THE INVENTION

The field of the invention is networking technologies.

BACKGROUND

Many military installations required separate and distinct communication networks where each physically distinct separate network is configured to handle distinct security levels. For example, a naval ship might require three distinct, physically separate networking infrastructures to support networking communication at the unclassified, secret, and top secret security levels. Such approaches are taken to ensure that information is properly isolated from unauthorized users. Although required for security reasons, such a secure networking infrastructure has the significant disadvantages of high cost (i.e., three times the cost of a single network) and excessive weight or volume due to three times the number of networking nodes and cables. A better approach would be to provide a common networking infrastructure that ensures secure data or communications remain isolated, possibly through non-overlapping topologies within the common networking infrastructure.

Others have put forth effort toward construction of non-overlapping network topologies. For example, U.S. Pat. No. 7,673,011 to Archer et al. titled "Configuring Compute Nodes of a Parallel Computer in an Operational Group into a Plurality of Independent Non-Overlapping Collective Networks", filed Aug. 10, 2007, describes organizing compute nodes into non-overlapping collective networks. Class routing instructions are provided to the node in the sub-group. Although Archer discusses non-overlapping collective networks, Archer fails to provide insight into constructing non-overlapping topologies that respect security levels.

Another example of previous effort includes U.S. Pat. No. 6,256,295 to Callon titled "Method and Apparatus for Determining Multiple Minimally-Overlapping Paths Between Nodes in a Network", filed Sep. 25, 1997. Callon seeks to construct paths between nodes in a network based on costs assigned to nodes. Callon also fails to provide insight into establishing non-overlapping topologies that respect security levels.

Yet another example include U.S. Pat. No. 8,001,280 to Blumrich et al. titled "Collective Network for Computer Structures", filed as an international application on Jul. 18, 2005. Blumrich enables establishing of high-speed, low-latency collective communication among processing nodes. Blumrich also fails to appreciate construction of non-overlapping topologies that adhere to security levels; rather Blumrich seeks to optimize communication metrics. Such an approach can result in a communication structure that exposes the network to security risks.

Interestingly, as pointed about above, these and other known references fail to account for constructing non-overlapping topologies based on security level.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for constructing non-overlapping communication topologies that respect security levels on a common networking infrastructure.

SUMMARY OF THE INVENTION

The inventive subject matter provides apparatus, systems and methods in which one can isolate or secure communications among devices having security levels. One aspect of the inventive subject matter includes a network, preferably a distributed network fabric of switches, comprising a fabric of networking nodes. Each node includes a plurality of ports allowing the networking nodes to interconnect via physical communication links. In a preferred embodiment, the fabric comprises multiple possible paths across the fabric for a pair of ports (i.e., two edge devices connected to the fabric via the ports). Contemplated networks further comprise at least one topology manager coupled with the nodes and configured to construct two or more non-overlapping topologies within the networking infrastructure where at least two of the topologies lack overlapping infrastructure within the bound defined by restriction criteria and security levels.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based networking infrastructure, various alternative configurations are also deemed suitable and may employ various computing devices including switches, routers, servers, nodes, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing a communication infrastructure capable of segregating networking infrastructure according a restriction criteria and security levels where traffic on non-overlapping topologies remain isolated from each other.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within this document "coupled with" is also construed to mean "communicatively coupled with" as in coupled components are able to communication over a network link.

Figure 1:
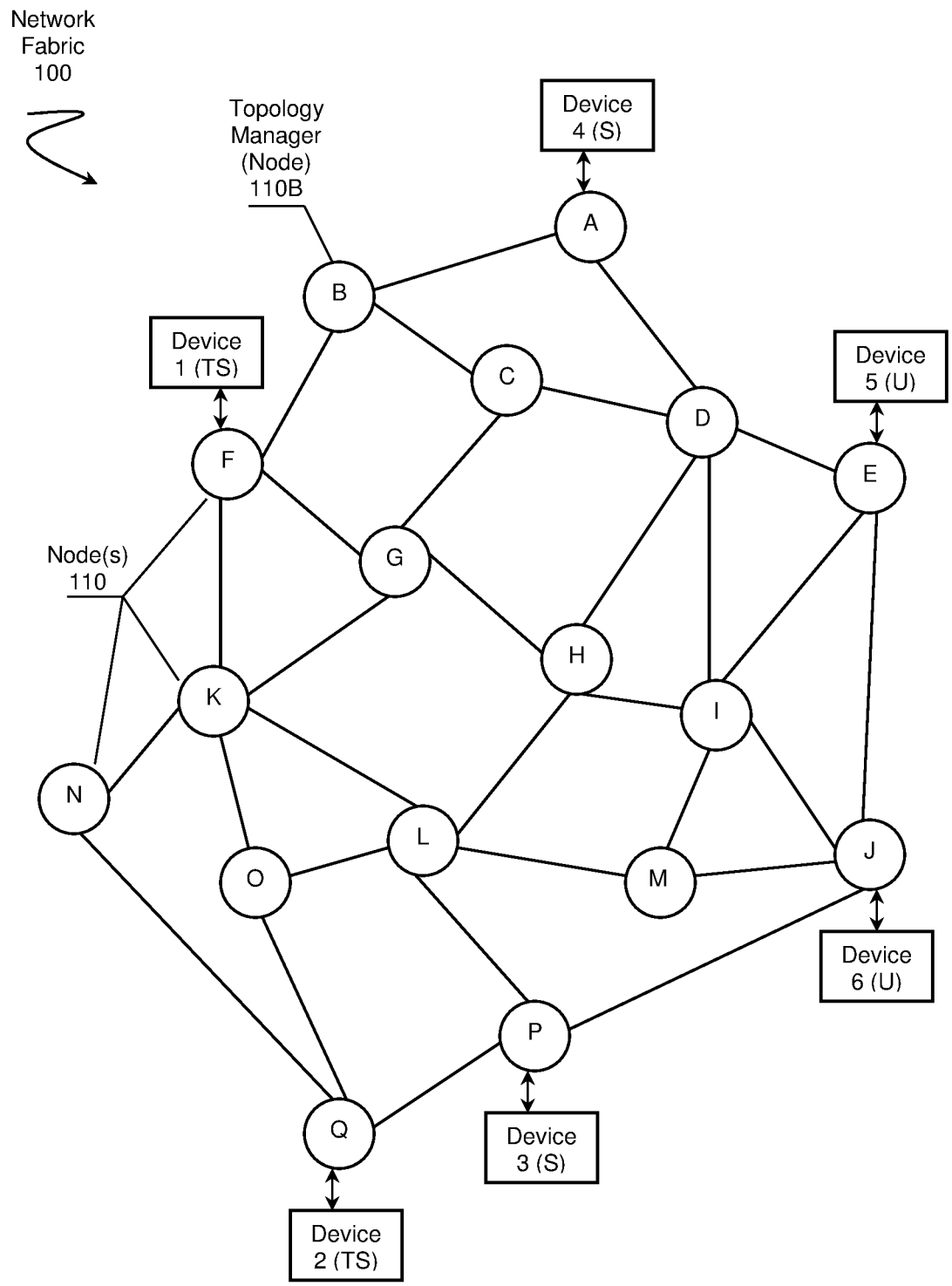
FIG. 1 is a schematic of distributed network having networking nodes connective devices that have different security levels.

In FIG. 1 a network comprises a networking fabric 100 of interconnected networking nodes 110 represented by nodes A-Q. Each of the nodes 110 preferably includes one or more physical ports (e.g., optic fiber, wired, wireless, etc.) configured to communicatively couple with other nodes 110 or edge devices. Further, fabric 100 can include multiple possible physical communication paths between ports through which one or more edge devices as represented by the edge devices 1-6 can exchange data. One should appreciate that a "possible" path simply represents a physical set of links that could be used by edge devices to transport data. However, such a path might not actually be instantiated for use.

In some embodiments, networking nodes 110 comprise network switches. However, other types of networking infrastructure are also contemplated where nodes 110 could include a router, a gateway, a firewall, an access point, or other type of data transport device. Switches produced by Cisco® or Juniper® can be suitably adapted for use with the inventive subject. An especially interesting type of switch includes switches capable of supporting general computation as described in co-owned U.S. patent application Ser. No. 12/849,521 titled "Hybrid Transport—Application Network Fabric Apparatus" filed on Aug. 3, 2010; and Ser. No. 13/024,240 titled "Distributed Network Interfaces for Application Cloaking and Spoofing" filed on Feb. 9, 2011. The networking nodes 110 can comprise a homogeneous collection of nodes (e.g., all the same switches) or a heterogeneous collection of nodes (e.g., switches, routers, different manufactures, etc.) that have been configured with appropriate roles or responsibilities as discussed herein.

Fabric 100 includes at least one topology manager 110B associated with the fabric 100. In the example shown, the topology manager 110B is one of the nodes; node B for example. Although the topology manager 110B is illustrated a being a node, one should appreciate the roles or responsibility of the topology manager 110B can be located or distributed about the fabric or even on devices (e.g., devices 1-6, etc.) external to the fabric. Further, in some embodiments, nodes 110 can be considered fungible with respect to topology management where any one, or even multiple nodes 110, could function as the topology manager 110B.

The topology manager 110B can be configured to establish two or more non-overlapping topologies within the fabric 100 where each non-overlapping topology lacks shared resources at least within the bounds of restriction requirements. Further, the non-overlapping topologies can be constructed according to one or more security levels. For example, devices 1 and 2 might required a topology that adheres to a Top Secret (TS) level of security, devices 3 and 4 might require a Secret (S) security level, and devices 5 and 6 might require an Unclassified (U) level of security. Thus each pair of devices, or collection of N devices, would require their own non-overlapping topologies to ensure that communications, or other data exchanges, retain proper isolation from others. Each isolated topology can restrict other topologies from accessing local topology data according to the rules within the restriction criteria.

Although the topology manager 110B is illustrated as on a single node possibly operating as a global topology manager, it is also contemplated that more than one topology manager 110B could be present. For example, each type of topology could have its own topology manager 110B capable of local topology management. The local topology manager could function according to various responsibilities including seeking to retain coherence among it infrastructural components, coordinating with other managers or a global manager, reconfiguring the local topology among infrastructure elements, or other responsibilities.

The topology manager 110B establishes the non-overlapping topologies based on overlapping restriction criteria. The criteria comprise the rules or instructions governing the bounds by which topologies can overlap where the bounds can adhere to one or more restriction levels. Restriction criteria represent requirements or optional conditions used by the topology to restrict overlap among topologies. Through the definition of restriction levels, the topology manager 110B can control the degree of overlap or define the level by which topologies do not overlap. The restriction levels can range from a fine grained internal node component level up through the fabric level. Contemplated levels can include a memory restriction, a core restriction, a port restriction, a link restriction, a node restriction, a channel restriction, a time-device restriction, or other levels of restriction.

Each component associated with a restriction level can include one or more properties where the components (e.g., processor, memory, link, channel, etc.) can include attributes or properties reflecting the components. For example, each data channel on a single optic fiber link capable of supporting multiple data channels could be characterized by their respective wavelengths of light, bandwidth entitlement, congestion, capacity, physical link length, attenuation, security, or other properties. The topology mangers 110B can leverage the properties of each component when establishing a topology. As another example, considered memory. Each portion of memory, physical or logical, can include properties describing the portion of memory: physical location in a node, size, throughput, security level (e.g., FIPS 140 level), or other memory properties. This information can be used by topology manager 110B to determine how to isolate data storage of one topology from another. A top secret topology might require that memory associated with it must be secured and located on a different node 110 than an unclassified topology.

Of particular note, aggregated non-overlapping topologies can be established where they do not overlap each other in a time-specific manner. In especially preferred embodiments, at any point in time, multiple security levels (e.g., TS, S, U, etc.) do not share elements or resources (e.g., paths; computational components: memory, cores, etc.; ports; etc.).

Topologies that leverage computational components (e.g., memory, processors, etc.) can be established to operate as a secured bus within a distributed kernel or separated kernel architecture where the kernel functions on the distributed computational components of the corresponding topology. Example techniques that can be leveraged for construction of such distributed kernels or computing busses are described in co-owned U.S. patent application publication 2010/0312913 to Wittenschlaeger titled "Hybrid Transport—Application Network Fabric Apparatus", filed Aug. 3, 2010; and U.S. Pat. No. 7,904,602 to Wittenschlaeger titled "Distributed Computing Bus" filed May 16, 2008, respectively.

Figure 2A:
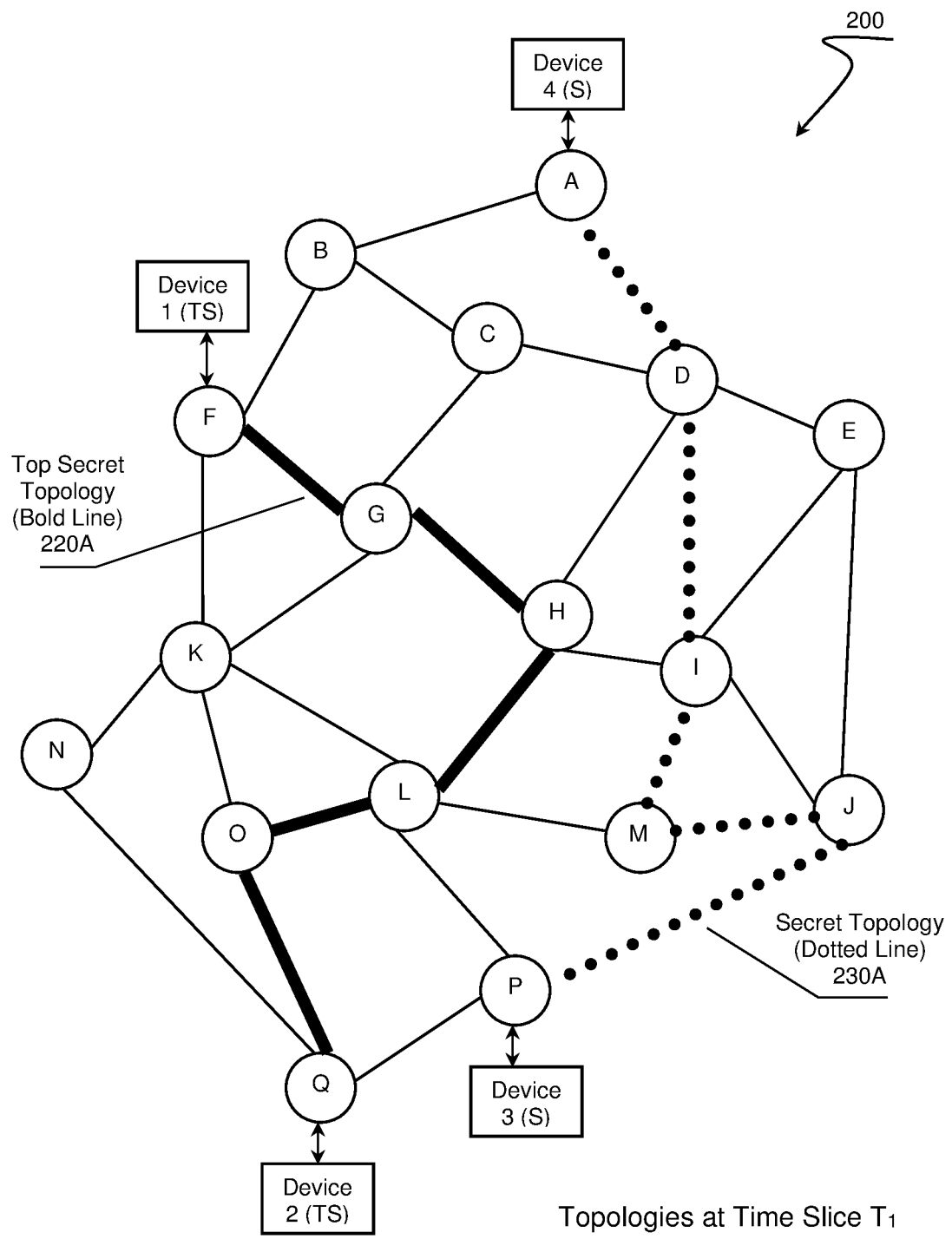
FIG. 2A is a schematic of a distributed network at a first point in time and having two non-overlapping topologies according to security levels.
Figure 2B:
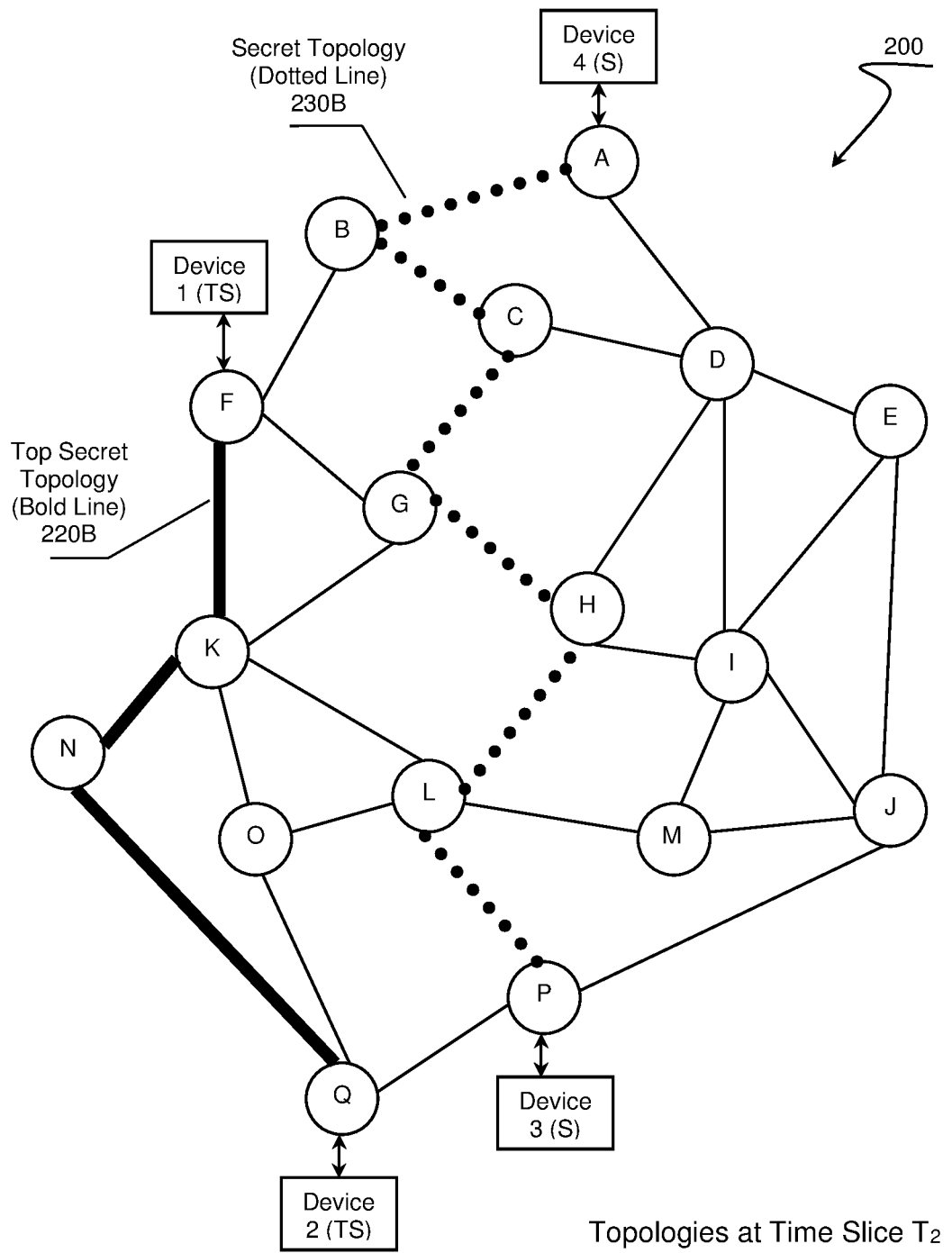
FIG. 2B is a schematic of the distributed network from FIG. 2A at a later second point in time where the non-overlapping topologies have been reconfigured.

One should note that the inventive subject matter is specifically considered to include a time-based separation of topologies as illustrated in FIGS. 2A and 2B. For example, each topology could change with time in a non-overlapping manner. FIG. 2A represents a point in time or at a time slice $T_1$. Device 1 and 2 require a top secret topology 220A and at time $T_1$ as indicated by the bold line top secret topology 220A runs through nodes "F-G-H-L-O-Q". Devices 3 and 4 require secret topology 230A as indicated by dotted line, and at time slice $T_1$ secret topology 230A runs through nodes "A-D-I-M-J-P". In this example, top secret topology 220A and secret topology 230A lack overlapping communication infrastructures. As time passes, the topology manager governing the topologies 220A and 230B can reconfigure the topologies.

FIG. 2B represents a state of fabric 200 at later point in time $T_2$. Top secret topology 220B has shifted to a new configuration that runs through nodes "F-K-N-Q" while secret topology 230B has also been reconfigured to run through nodes "A-B-D-G-H-L-P". Note that the two topologies at time $T_2$ comprise non-overlapping communication infrastructures within fabric 200. Changing network topologies with respect to time can be considered a form of Time-Division Compartmentalized Access (TDCA) or Time-Division Exclusive Access (TDEA).

Although each topology is presented as being between two edge devices, one should appreciate that the topologies are considered comprise the communication infrastructure between port pairs within the fabric. Thus, devices 1 and 2 couple with fabric 200 by a first port pair while devices 3 and 4 couple with fabric 200 by a second port pair.

The example in FIGS. 2A and 2B present a simple case of non-overlapping paths. One should appreciate that the non-overlapping portions could extend down to the node level, processor level, core level, or even memory level. For example, a TS level might restrict other types of traffic or computation from being present on cores within the same processor. Additionally, memory can be allocated for use by the topology as required, including allocation of logical blocks of memory or allocation of physical memory chips or board. Such memory can adhere to FIPS 140 standards as required.

In some embodiments, reconfiguration of topologies can be performed in a manner that respects the restriction criteria associated with security levels. Referring back to FIGS. 2A and 2B, the topology manager that constructs top secret topology 220B can have priority over lower security level topologies, secret topology 230B for example. In such cases, the topology manager can reconfigure the higher priority topology first and possibly wipe clean its previous presence on a node. Of note, FIG. 2A illustrates that top secret topology 220A passes through node G and FIG. 2B illustrates that secret topology 220B also passed through node G. Before time slice $T_2$ arrives, the top secret topology manager can shift to top secret topology 220B and wipe clean node G. Then the secret topology manager can proceed with its task of shifting secret topology 220A to secret topology 220B passing through node G.

The security levels can also cover a broad spectrum of levels from private or public security level up through highly secured levels of security. Example security levels include public, unclassified, private, controlled, secured, secret, top secret, compartmented, proprietary, or other levels. Security levels can include a hierarchy of inheritable attributes where a topology assigned a high level of security could inherit features or restriction criteria from lower level security levels. For example, a top secret topology could restrict access to memory as required by a secret topology, but could additionally require the data in the memory to be encrypted.

When topologies are established, the topology manager preferably establishes the non-overlapping topology based restriction criteria that operate as a function of security levels. One should appreciate that these two concepts can be considered orthogonal to each other. For example, the restriction levels might only bound use of links or nodes, which would not necessarily affect security level requirements. Thus, one can consider restriction levels and security levels as forming a matrix of rules or instructions outlining criteria for building or otherwise constructing topologies. The following matrix illustrates such a concept where the columns represent a security level and the rows represent bounds of restrictions.

|  | Compartmented | Top Secret | Secret | Unclassified |
| --- | --- | --- | --- | --- |
| Memory | Required | Not Required | Not Required | Not Required |
| Core | Required | Not Required | Not Required | Not Required |
| Processor | Required | Required | Not Required | Not Required |
| Port | Required | Required | Required | Not Required |
| Channel | Not Required | Optional | Required | Not Required |
| Node | Required | Required | Not Required | Not Required |

The matrix is a simple set of requirements for a security level and restriction level, but could have any level of complexity where each cell can contain specific rules, exclusions, requirements, instructions, or optional conditions dictating how a topology could or should be constructed by a topology manager. The topology manger can apply the restrictions to a mapping of known fabric resources, an image map file of resources in the fabric for example. As an example of exclusion rules, a topology requiring a Secret level might be able to share a processor with Unclassified data while a Top Security level might not be able to share the processor. Thus, each topology established by the topology manager does not overlap with the other topologies within the bounds defined by the restriction criteria even when the topologies having the same security levels or different security levels.

Security levels are presented above from the perspective of military security. Other types of security levels are also contemplated beyond military security. Non-military security can include privacy levels that can apply to medical or financial information, digital rights management levels that dictate how a rights owner's assets move through the fabric, social networking relationship levels that govern how data should move among friends or contacts, or other from of security levels.

As mentioned previously, the topology manager can be further configured to reconfigure the topologies to a new topology as desired, possibly automatically. In some embodiments, the topology manager can reconfigure the topologies periodically according to a secure function based on one or more secret keys. Such an approach provides additional security to protect against exposure of secured data passing through intermediary nodes. Reconfiguration of a topology can occur across the entire fabric, or within a sub-group of nodes belonging to an existing topology. For example, referring back to FIG. 1, devices 5 and 6 might communicate via an unclassified topology having a sub-group defined by nodes E, D, I, M, and J, but only use paths established through nodes E, I, and J. After reconfiguration, the updated unclassified topology could simply use E and J while still falling within the group of the same sub-group.

When a topology manager reconfigures a topology, the reconfigured topology is preferably sufficiently established to allow edge device to retain connectivity. For example, the reconfiguration event can be timed to ensure that edge devices are prepared for the change over by allowing the edge devices to enter a quiescent state. In more preferred embodiments, the reconfiguration occurs in a manner that is transparent (i.e., does not affect) the edge devices. Such an approach can be achieved by nodes in the topology buffering or holding traffic until the reconfiguration is complete. In some embodiments, the reconfiguration can occur immediately based on a time synchronized table where the table includes one or more topology definitions with respect to times. The table can be disseminated to each affected node a priori. When a synchronization point is achieved, all nodes simply begin using the new definition for forwarding packets their respective ports appropriately without significant interrupt of communication among edge devices. Time synchronization can be achieved through time protocols (e.g., TP, NTP, etc.), synchronized clocks, standard clocks, GPS signals, or other time sources.

The topology manager can disseminate established topology definitions through various methods depending on the embodiment. In some embodiments, the topology manager distributes each topology definition (e.g., a table, listing, instructions, routes or paths, security protocols or algorithms, etc.), along with any allocated resources, to each node. The topology definition can be compiled within a topology image file, which can then be sent among relevant nodes for deployment. Each node then configures itself according the definition. In other embodiments, each topology could comprise its own local topology manager. The local topology managers could coordinate together or with a global manager to request or requisition resources. Thus, the global manager would lack visibility into a complete picture of how each topology is arranged or established while each local manager would lack visibility into the global view. Such an approach is considered more secure as the fabric would lack a single manager having a complete view of all topologies.

Figure 3:
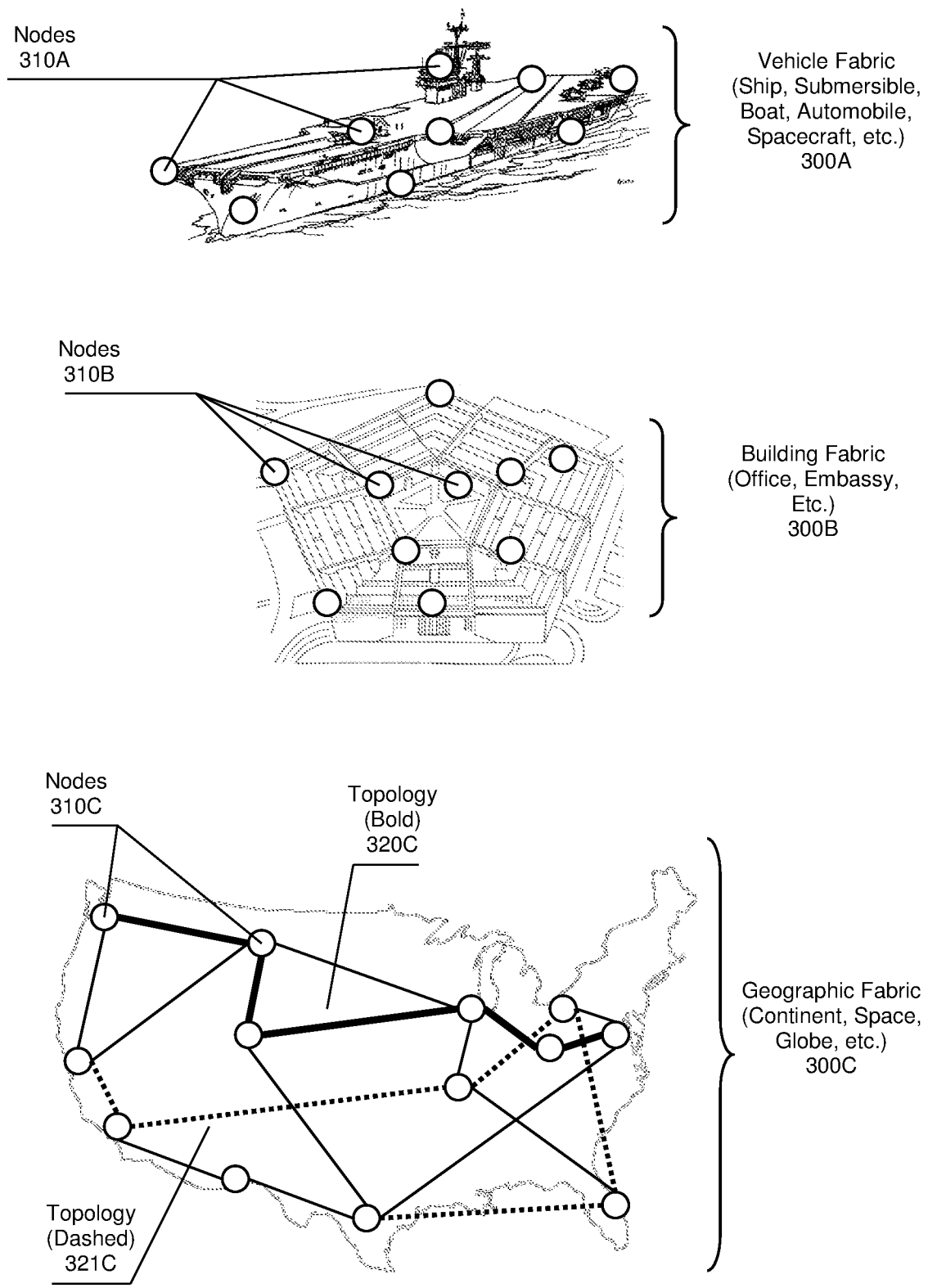
FIG. 3 illustrates multiple possible fabrics that can leverage non-overlapping networks.

Network fabric 200 is illustrated as a generic fabric of nodes for illustrative purposes only. Fabrics can take on many different forms as shown in FIG. 3 and as represented by fabrics 300A, 300B, and 300C. Although only three examples are shown, it should be appreciated that any type of fabric could benefit from the disclosed techniques. Examples include storage area network fabrics, medical record exchange fabrics, gaming fabrics, computer simulation or modeling fabrics, genomic or data analysis fabrics, wireless mesh network fabrics, cell phone fabrics, peer-to-peer fabrics, or other types of fabrics. Communication links are not show in example fabrics 300A and 300B to keep the representation clear.

Fabric 300A represents a vehicle fabric disposed within a ship. Such a fabric can be advantageous because it reduces the need for duplicated infrastructure while also ensuring or enforcing physical isolation among networks. In such embodiments, topologies within the vehicle can be configured according to vehicular attributes or properties. A high level security topology can include restriction criteria reflecting the positions of nodes 310A in the vehicle. For example, a top secret topology could preferentially include nodes within an interior portion of a ship, which would likely be more secure or robust during war time. Thus, topologies can be established based on attributes including location of nodes 310A in a vehicle, movement of nodes around a vehicle (e.g., aircraft on an aircraft carrier), or other attributes. In embodiments where networking fabric 300A is installed within an aircraft carrier or submarine as a single networking infrastructure, networking infrastructure can be partitioned into a multiple non-overlapping topologies where each topology adheres to a required security level: top secret, secret, unclassified, or other desired levels. The advantage is a single networking infrastructure can support non-overlapping topologies to keep information isolated from unauthorized access while reducing cost, weight, and space required for the networking infrastructure.

Fabric 300B illustrates a building fabric comprising multiple nodes 310B placed around a building. Contemplated buildings that can benefit from such fabrics include office buildings, military installations, embassies, researching facilities, campuses, or other structures. Topologies deployed within fabric 300B can be constructed or established based on restriction criteria operating as a function security levels or building attributes. Building attributes can include architecture features, duct passages, room assignments, or other properties.

A fabric can include a geographically distributed fabric 300C spanning across a continent or even the globe. One networking infrastructure that could be suitability adapted to utilize the disclosed techniques includes the National Lambda Rail (NLR; see URL www.nrl.net). The NLR supports optic fiber links configured to support over 40 Gpbs per link. Further, nodes 310C could offer over 100 Tbps, possibly based on the Infinera® DTN-X photonic integrated circuit. Still, in other embodiments where implementations require tighter controls, the fabric could be disposed within a single housing.

Fabric 300C also illustrates two non-lapping topologies 320C and 321C. Geographically distributed topologies 320C and 321C can be constructed according to geographical attributes as dictated by security levels or restriction criteria. For example, high security topologies, possibly topology 321C, might be required to utilize nodes 310C that have high uptime during winter months. While topology 320C, possibly an unclassified topology, can be constructed based on attributes such as cost per unit watt of power to maintain the topology, or other geographical parameters. Fabric 300C is illustrated as being a terrestrial fabric. One should appreciate that such geographically fabrics can also include aerial or spacecraft nodes (e.g., planes, balloons, low earth orbit satellites, geo synchronous satellites, etc.)

One should appreciate the distinction between creating a secure topology and optimizing a topology according to networking metrics. A secure topology utilizes security, or security levels, to determine a possible configuration, even when the topology might result in a non-optimal configuration for communication. Thus, one can considered security as primary criteria by which a topology is established while metric optimization would likely comprise secondary criteria for a topology configuration.

The inventive subject matter is also considered to include networking nodes (e.g., switches, routers, etc.) configured to operate as topology managers, function within non-overlapping topology, or allocating internal or external resources for use in a non-overlapping topology. Each node can also be configured to selectively operate according to Strongly Isolated Computing Environment (SICE) techniques to minimize exposure of a topology ("SICE: a hardware-level strongly isolated computing environment for x86 multi-core platforms", CCS '11 Proceedings of the 18th ACM conference on Computer and communications security, Pages 375-388 to Azab et al.).

Figure 4:
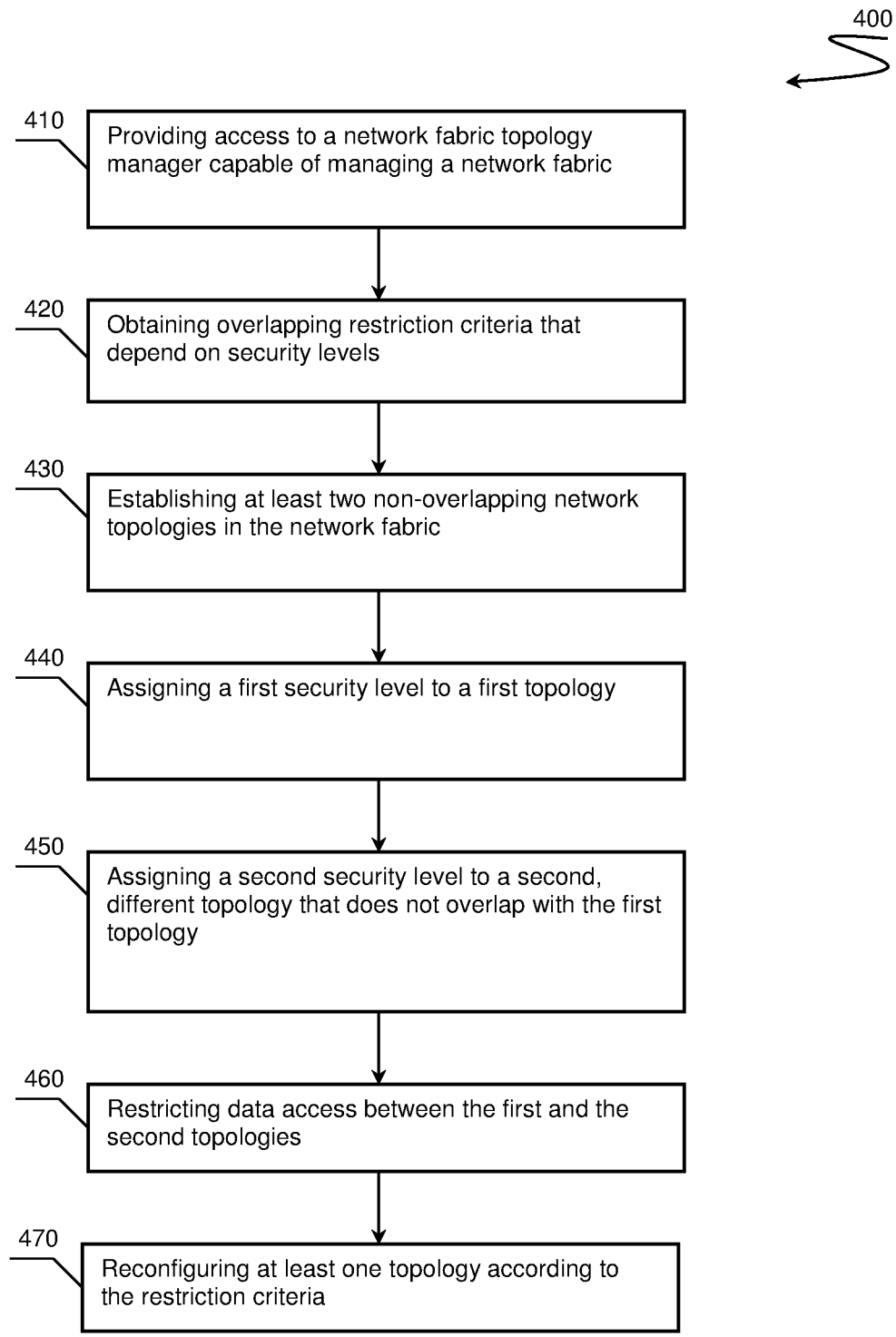
FIG. 4 illustrates a method of management a network fabric.

FIG. 4 presents method 400 of managing a network fabric where the network fabric comprises a plurality of interconnected networking nodes. Each node includes ports capable of connecting or communicatively coupling with other nodes via one or more physical links (e.g., Ethernet cables, optic fiber cables, etc.). The fabric can be characterized by providing multiple possible physical paths between pairs of ports on the fabric. Each pair of ports can be considered an input/output pair of ports through which edge devices exchange data over the fabric. One should appreciate that the paths among ports can be fully enumerated and compiled into an image file possibly representing all possible paths or available resource between any two ports. The image file can then become a foundational element on which the topology establishes the topologies.

Step 410 includes providing access to a network fabric topology manager that is able to construct or manage topologies of communication infrastructures within the fabric. In some embodiments, each node in the fabric can be fungible with respect to one or more roles or responsibilities of topology manage. In such scenarios, at least one node can be elected or otherwise designated as a topology manager. The topology manager can be a global manger that manages all topologies across the network or could manage a single topology. The topology manager does not necessarily have to be a node within the fabric. For example, the topology manager could include an edge device, possibly under control of a third party or NOC, where the edge device communicates with relevant nodes over the fabric.

Topology management extends beyond establishing or reconfiguring a topology with respect to security. Topology management can also include monitoring topology metrics, providing alerts or notifications when events are triggers from the metrics, compiling reports relating to the topology, inventorying elements of the topology, logging events, enforcing security protocols, or other types of management. Example techniques for managing fabrics include those described in U.S. Pat. No. 7,548,545 to Wittenschlaeger titled "Disaggregated Network Management", filed May 13, 2008.

Step 420 includes the topology manager obtaining overlapping restriction criteria that operate according to one or more security levels. The overlapping restriction criteria include rules dictating the nature of a topology while respecting one or more security levels. The rules can be defined based on attributes of the nodes, fabric, location, environment, or other factor of the ecosystem. For example, a security level could require that an associated topology restrict general data transport across the topology in favor of appropriately secured or tagged data. The restriction criteria can be presented in the form of manager instructions, possibly as a matrix of requirements as discussed previously. In some embodiments, the topology manager can be deployed in the field with an a priori defined set of restriction criteria, while in other embodiments the topology manager can obtain the restriction criteria from an authorized or authenticated source.

Step 430 includes establishing at least a first and a second non-overlapping network topology according to the overlapping restriction criteria. The first topology can be associated with a first security level while the second, different topology can be associated with a second security level. For example, a single fabric can be deployed within a navel vessel. The fabric can be provisioned to have a top secret topology, a secret topology, and an unclassified topology in a manner where each topology comprises communication infrastructure that do not overlap within the bounds of the restriction criteria. One should appreciate that although the previous example including three non-overlapping topologies, each assigned a different security level, any number of topologies could be deployed assuming sufficient communication infrastructure resources.

Topologies can be established based on a numerous properties available to the topology manager. For example, the overlapping restricting criteria can depend on the communication infrastructure of the topology (e.g., ports, nodes, links, physical location or position, etc.), latency measurements, manufacture of the equipment, owner of the equipment, certification levels, or other factors.

Regardless of the factors that govern instantiation of the topology, a topology manager can apply the restriction criteria the known resources within the fabric. For example, the topology manager can begin with an image file representing a view of all possible paths among relevant ports and available resources. The topology manager then applies the overlapping restriction criteria to the image file to generate a topology definition of available paths or resource for each topology within the bounds of the restriction criteria. Paths or other resources in the topology definition can be added or removed iteratively until a stable configuration or acceptable configuration is achieved for the target topologies. One should appreciate that the overlapping restriction criteria dictates rules governing the extent which the topologies under construction should not overlap. As the topology manager processes the topologies definitions, the topology manager ensures that "white space" between the topologies properly adheres to the rules in the overlapping restriction criteria. As the topology manager establishes the definitions of the topologies the manager can activate the paths or resource for the target topologies. Further the topology manager can deactivate or isolate resources that are required to fall within the white space as dictated by the overlapping restriction criteria.

The bounds of the restriction criteria can take on a broad spectrum of conditions. In some embodiments, the boundary conditions can reflect physical boundaries. Consider a scenario where secured and unsecured traffic must be isolated. The topologies supporting the two types of traffic can be established in a manner where they lack a common physical communication link, or in a manner where the topologies lack a common node depending the severity of the restrictions. In such a scenario, the topologies must have a white space between them having no common links or nodes. In other embodiments, the boundary conditions can reflect logical boundaries. A logical boundary represents a boundary restriction more reflective of a virtual condition or logical white space. Example logical boundaries could include restrictions representing channel identifier on a communication link (e.g., wavelength of light, polarization, etc.), an encryption scheme for traffic, or other types of logical white space. Each boundary condition can be considered a restriction level that outlines or governs corresponding features of the topology. Example restriction levels can include a memory restriction, a core restriction, a port restriction, a link restriction, a node restriction, a time restriction, device restriction, or other types of restrictions.

Logical boundaries can be employed to ensure separation or isolation of resource through other types of restrictions as well. As referenced briefly above, logical boundaries can include data channel identifiers over communications link. For example, in embodiments where the communication links comprises optical fibers, restrictions can be made with respect to wavelength of light used to transport data from one node to another, possibly through wavelength division multiplexing. Two topologies can be restricted to utilize different wavelengths (i.e., channels). Thus, topologies could be restricted by a white space of a number of channels between the topologies; possibly one channel, ten channels, 100 or more channels for example over the same link. One should appreciate that such isolation can apply at various scales in the fabric. The restrictions could apply at the link level, node level, or even at the topology level were an entire topology could be assigned a single wavelength. In other embodiments, polarization-based channels can be used as restriction criteria, possibly based on vector beams or vortices (G. Milione, H. I. Sztul, D. A. Nolan, and R. R. Alfano. Higher-Order Poincaré Sphere, Stokes Parameters, and the Angular Momentum of Light, Phys. Rev. Lett. 107, 053601 (2011)).

Another type of logical boundary or restriction includes restricting topologies based on permitted protocols. Such an approach is considered advantageous because protocol isolation can be used to ensure that data from different topologies is restricted from being exposed to the same code or memory, especially when the topologies are allowed to overlap on a node, but are otherwise restricted. Protocol restriction criteria can depend on one or more layers of a communication stack where the restrictions can be made on a layer-by-layer (e.g., physical layer, link layer, network layer, transport layer, session layer, presentation layer, application layer, etc.) basis or even among protocols as the same layer. For example, a the transport layer one topology might be restricted to use only TCP related protocols while a second topology might be restricted to use only UDP based protocols, subject to security levels. All protocol restrictions are contemplated.

The boundary conditions could allow for some level overlap to some extent in some embodiments. For example, secret data can flow through a top secret topology. However, top secret traffic might be restricted from flowing through portions of the secret topology. Such scenarios give rise to nested topologies where one topology, possibly assigned a higher security level, can include portions of a lower security level topology.

Step 440 includes assigning at least a first security level to a topology. Example security levels can include public, unclassified, private, controlled, secured, secret, top secret, compartmented, or other levels. As discussed previously, security levels can include non-military levels possibly based on privacy, digital rights management, genomic information, ownership, analysis requirements, or other properties that can differentiate traffic in a network. Similarly step 450 includes assign at least a second security level to a second, different topology that fails to overlap with the first topology. Such an approach ensures proper isolation of data transport from one topology to another.

The security levels of the topologies do not necessarily have be a different position in a hierarchal structure. In some embodiments, the security levels could be at the same position in a hierarchal structure or otherwise represent the same security parameters, but relate to different topology owners. For example, two content providers could each desire a topology within a fabric where each topology has the same security requirements, possibly at the same privacy level. However, the overlapping restriction criteria might dictate that the two topologies function on completely separate nodes, or even require that the white space between the topology include non-functioning intermediary nodes between the topologies. Thus, nodes in one topology lack any physical connections to nodes in the other topology.

Step 460 includes restricting access between or among the constructed topologies. Restricting access can include enforcing data transport rules or routing tables to ensure that data from one topology is isolated from another topology. The configuration or topology rules that govern restricting access can be embodied within the overlapping restriction criteria used to construct the topologies.

Step 470 can optionally include reconfiguring at least one topology according to the overlapping restriction criteria. In some embodiments, the reconfiguration can occur on a regular or irregular basis, possibly according to a secret function applied to a reconfiguration key associated with the topologies security level. Such an approach is considered advantageous because the topology can shift from one configuration to another quickly in an unpredictable fashion from the perspective of a potential threat.

In some embodiments, the fabric can comprise bridges between topologies to allow for inter-topology communications when a need arises. Such an approach might not be desirable for military-based applications. However, the approach might be suitable for other fabrics, possibly medical exchange fabrics.

A topology bridge can be constructed through various techniques. A topology manager, according to the overlapping restriction criteria, can identify a node adjunct to both topologies. The topology manager can then establish the intermediary node as part of both fabrics to support required data exchange or data flow. Alternatively, the topology manager can simply link adjacent nodes via a communications link. Regardless of the connection of the bridge, the topology manager can further enforce bridge traffic flow rules. For example, secret data could flow to a top secret topology, but not vice versa.

A topology bridge can also be constructed via a secured channel. For example, each topology can include a public-private key pair. When a bridge is to be established, the topology managers can construct a secure change based on an exchange of their public keys. The secured bridge can be between topology managers, or between suitably selected nodes. Once the secured bridge is constructed, the topologies can exchange data according to known secure protocols or algorithms (e.g., SSL, SSH, AES, 3DES, etc.). Once the communication is complete, the topology managers can deconstruct the bridge.

It is also contemplated that networking nodes can include one or more physical features that aid in isolating topologies from each other. For example, a network switch or router could physically disengage ports or other resources that are not relevant to the topology to reduce risk of such resources being exposed externally. The connectors for a port could physically retract into a housing or power to the port could be disabled to render the port inoperative while its node is participating in a topology and while the port, or other resources for that matter, are not required.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of reconfiguring a node in a network fabric of interconnected networking nodes, each node having ports connected to at least one other node via physical communication links, the network fabric comprising a common networking infrastructure characterized by a plurality of possible physical communication paths between a first port pair and at least a second port pair, the first port pair comprising a first pair of edge devices and the second port pair comprising a second pair of edge devices that is different from the first pair of edge devices, the method comprising:
  assigning, by a topology manager, the node in the network fabric to communicate in a first physical network topology at a first time slice, according to overlapping restriction criteria operating as a function of topology security levels, wherein the common networking infrastructure includes a second physical network topology that does not overlap with the first topology within bounds defined by the restriction criteria, the second topology does not include the node at the first time slice, a first security level is associated with the first topology and a second security level is associated with the second topology;
  determining whether the first security level associated with the first topology has a higher priority than the second security level associated with the second topology;
  in response to a determination that the first security level has the higher priority, reconfiguring the node to stop communicating in the first topology; and
  at a second time slice subsequent to the first time slice and subsequent to reconfiguring the node to stop communicating in the first topology, reassigning the node to communicate in the second topology, wherein the first topology does not include the node at the second time slice.

2. The method of claim 1, further comprising, prior to reconfiguring the node to stop communicating in the first topology, buffering or holding traffic in one or more other nodes of the network fabric to allow the pairs of edge devices to retain connectivity during the reconfiguration and reassignment of the node.

3. The method of claim 2, further comprising releasing the buffered or held traffic from the one or more other nodes of the network fabric after the node has been reassigned to the second topology at the second time slice.

4. The method of claim 1, further comprising determining whether each of the edge devices has entered a quiescent state,
  wherein the reconfiguring and reassignment of the node to the second topology occurs only after a determination that each of the edge devices has entered the quiescent state.

5. The method of claim 1, further comprising receiving, at the node, a time synchronized table including at least a definition of the first topology with respect to the first time slice and a definition of the second topology with respect to the second time slice,
  wherein reassigning the node to the second topology includes configuring the node to use being using the definition of the second topology at the second time slice to forward packets to respective ports according to the definition of the second topology.

6. The method of claim 5, wherein reassigning the node to the second topology includes synchronizing the timing of the reassignment with reassignment of at least one other node of the network fabric, according to at least one of a time protocol, a synchronized clock, a standard clock, and a global positioning system (GPS) signal.

7. The method of claim 1, wherein the reconfiguring and reassigning the node are performed according to at least one of a time-division compartmentalized access (TDCA) protocol and a time-division exclusive access (TDEA) protocol.

8. The method of claim 1, further comprising obtaining an image map file of resources in the network fabric,
  wherein reassigning the node to the second topology incudes reassigning the node according to the obtained image map file.

9. The method of claim 1, further comprising:
  reconfiguring the node to stop communicating in the second topology; and
  at a third time slice subsequent to the first time slice and the second time slice, reassigning the node to communicate in a third topology, wherein the third topology does not overlap the first topology and does not overlap the second topology, within the bounds defined by the restriction criteria, and the first topology and the second topology do not include the node at the third time slice.

10. The method of claim 1, wherein the bounds defined by the restriction criteria comprise restriction levels, and the restriction levels include at least one of a memory restriction, a core restriction, a port restriction, a link restriction, a node restriction, a channel restriction, a time restriction, and a device restriction.

11. The method of claim 1, wherein the first security level comprises at least one of a public security level, an unclassified security level, a private security level, a controlled security level, a secured security level, a secret security level, a top secret security level, and a compartmented security level.

12. The method of claim 11, wherein the second security level comprises a different security level than the first security level.

13. The method of claim 1, wherein the node comprises the topology manager.

14. The method of claim 1, wherein the node comprises at least one of a switch, a router, a gateway, a firewall, and an access point.

15. The method of claim 1, wherein the node is disposed within a vehicle, and the vehicle includes at least one of a ship, a boat, a submarine, an airplane, a spacecraft, a truck, and an automobile.

16. The method of claim 1, wherein the node is disposed within a building.

17. The method of claim 1, wherein the first topology and the second topology each comprise communication infrastructure including at least one of a core, a processor, a memory, a bus, a port, a communication link, and a channel.

18. The method of claim 1, wherein the network fabric comprises a geographically distributed fabric.

19. The method of claim 1, wherein the node is coupled to communicate with at least one other node of the network fabric via an optic fiber link.

20. The method of claim 19, wherein optic fiber link is configured to support a bandwidth of at least 40 Gbps.

* * * * *